Sept. 14, 1954   J. F. HORNER   2,688,866
HYDROCARBON DEW POINT INDICATOR
Filed Nov. 29, 1951   2 Sheets-Sheet 1

INVENTOR.
John F. Horner
BY
Everett A. Johnson
ATTORNEY

Sept. 14, 1954

J. F. HORNER 2,688,866

HYDROCARBON DEW POINT INDICATOR

Filed Nov. 29, 1951

INVENTOR.
John F. Horner

BY Everett A. Johnson

ATTORNEY

Patented Sept. 14, 1954

2,688,866

UNITED STATES PATENT OFFICE 2,688,866

HYDROCARBON DEW POINT INDICATOR

John F. Horner, Galveston, Tex., assignor, by mesne assignments, to Pan American Refining Corporation, Texas City, Tex., a corporation of Texas Application November 29, 1951, Serial No. 258,927

10 Claims. (Cl. 73—17)

This invention relates to the accurate determination of the dew point of a hydrocarbon stream. It has particular reference to an apparatus for automatically and continuously determining the dew point of a hydrocarbon stream. Still more specifically the invention relates to means for continuously recording the dew point.

In the refining of petroleum there is obtained a range of products from the butanes through the gasoline stocks and heating oils. Their separation includes many operations based on temperature and involves continuous fractionation, batch fractionation, stripping, gasoline stabilizing, etc. These operations are ordinarily manually controlled by withdrawing batch samples and thereafter measuring in a laboratory the ASTM end point which relates to the dew point. The actual manipulation time for a standard ASTM end point test is approximately 50 minutes per sample but the total elapsed testing time from the drawing of the sample to the reporting back by the laboratory may be several hours. Obviously, where large quantities of material are handled, control based on up-to-the-minute information is preferred over that based on information which is several hours late and which is satisfactory neither from the quality of product nor economy of operation.

A principal object of my invention is the determination of the dew point of a vapor while it is flowing along in a stream. Another object of my invention is to provide an apparatus for measuring the dew point of hydrocarbon vapors. A more detailed object is to provide an apparatus for automatically measuring and recording the dew point of a flowing stream. These and other objects of the invention will become apparent as the detailed description thereof proceeds.

In general, I attain the objects of my invention by providing means for vaporizing the liquid to be used in the tested, temperature-controlled means for cyclically condensing a portion of the vapors, means for detecting the condensation, and means for recording the temperature of the condensation. The heat input to the vaporizer is controlled by a temperature controller set to maintain the heating coil outlet somewhat above the dew point of the stream as determined by a thermocouple in a test chamber having the detector. The lower portion of the chamber comprises a catch pot which is removably fixed and serves to retain gum or other non-vaporized deposits.

The hot vapors pass upwardly through the test chamber into contact with the detector element and are then withdrawn from the chamber into a condenser and may be discarded or returned to the process. The detector comprises a heated U-shaped collector element which is electrically heated and disposed above a hot wire filament of high resistance and high temperature coefficient of resistivity which is connected to a detector circuit supplying a current which normally maintains the filament at an elevated temperature. The temperature of the collector is lowered until a drop of liquid, condensed from the surrounding vapors, falls from the collector element to the hot filament, changing the resistance of the filament by cooling it. The change in resistance of the filament triggers an electronic controller closing a relay which connects thermocouple leads from the collector element to the recorder-controller and simultaneously increases the heat input to the collector again raising its temperature to above the dew point. The relay reopens when sufficient heat has been supplied to vaporize the drop on the filament and restore its normal high temperature resistance. Thus, the determination of the dew point of a flowing stream is cyclical and the cycle length can be determined by controlling the net heat input to the collector element.

My invention may be used in connection with any process where the dew point, or related ASTM end point, is a product specification. Thus in the case of gasoline stabilizers and the like, the necessity for manual control based upon periodical ASTM distillations is avoided. Likewise, the invention may be used in reflux control of continuous fractionation columns, cut point control for batch fractionation, stripping rate control of stripping columns, etc. The indications of dew point may then be used for the continuous and automatic recording and/or controlling of the dew point or end point of a stream. Thus in blending operations the composite stream may be subjected to the dew point test and the appropriate valves controlled in response to the indicated dew point temperature.

The invention will be described in connection with a specific embodiment which is illustrated in the drawings wherein.

Figures 1, 2:
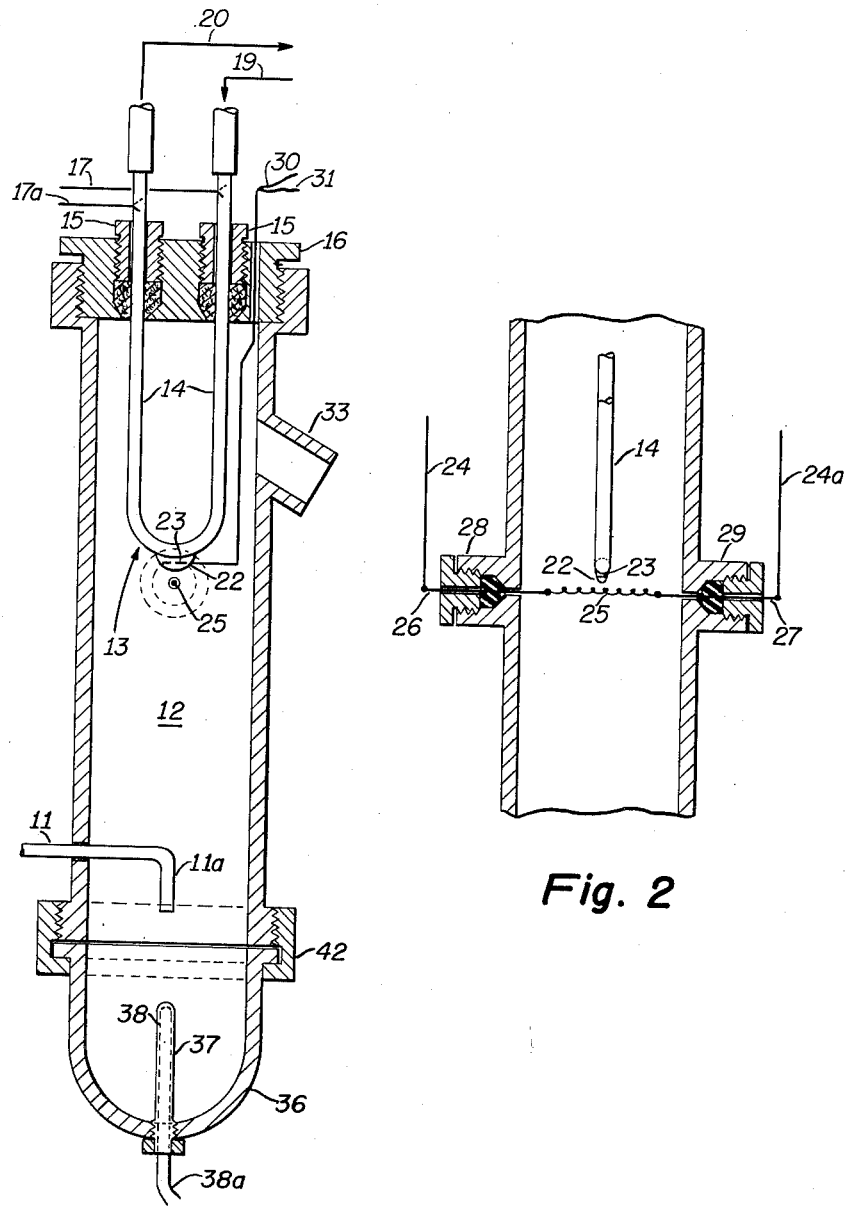
Figure 1 is an elevational view, partly in vertical section, of the apparatus embodying my invention.
Figure 2 is an enlarged fragmentary view of a portion of the apparatus.
Figure 3:
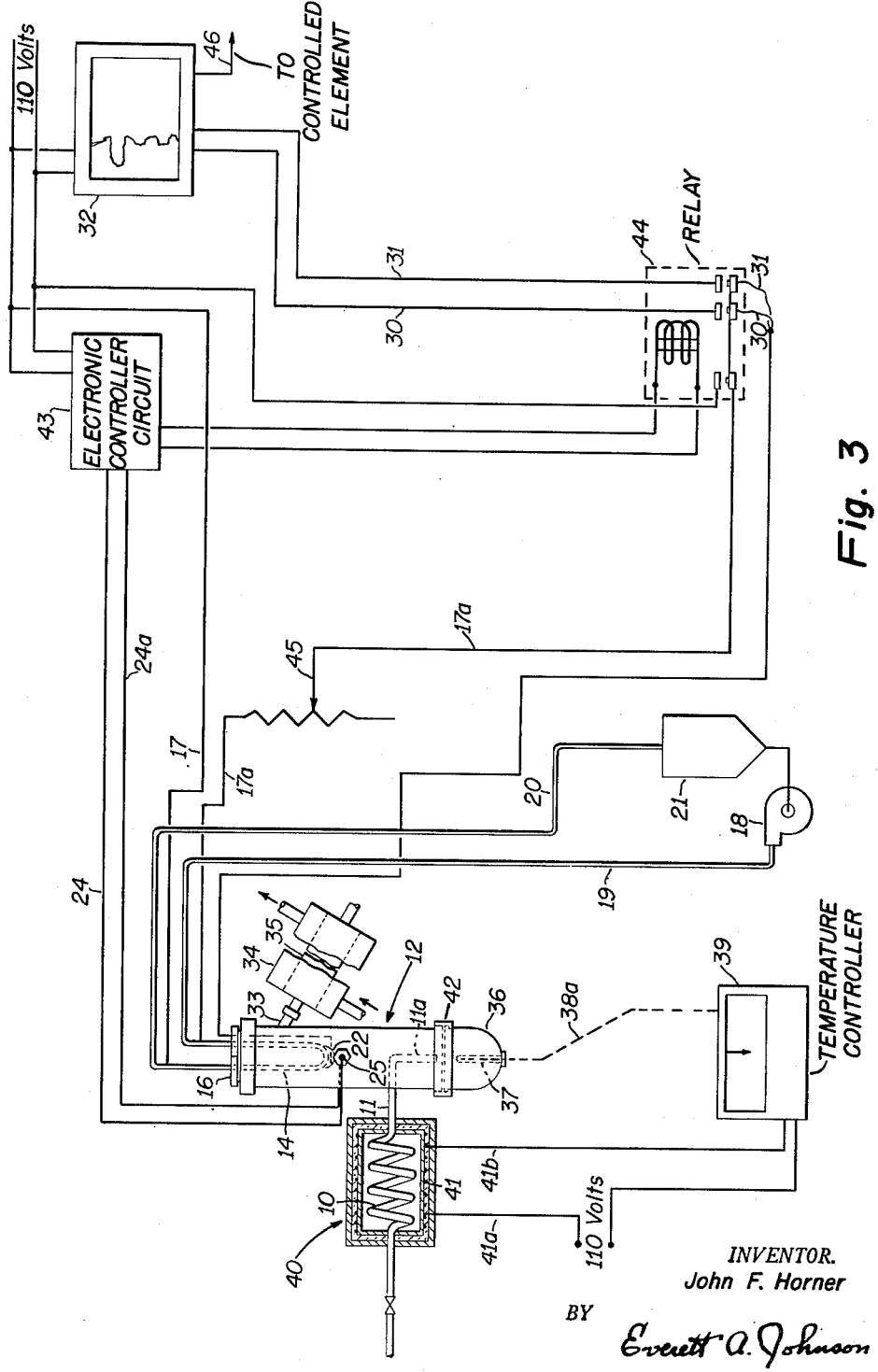
Figure 3 is a schematic diagram of a dew point control system according to my invention.

Referring to the drawing wherein corresponding parts are designated by the same reference characters, the apparatus embodies a vaporizer coil 10 which discharges by conduit 11 into the measuring chamber 12. In the upper part of the chamber 12 is provided a detector means 13 shown as comprising a small U-shaped tube 14 of high resistance material such as Nichrome held by packing gland and nut 15 in plug 16 threaded into the open end of chamber 12. To the exterior ends of the legs of the U-shaped tube 14 are connected electrodes or leads 17 and 17a for supplying heating current to the tube 14.

The pump 18 serves to circulate a small flow of oil through the electrically non-conducting conduits 19 and 20, the U-tube 14 and the oil receiver 21 in series. At the bottom of the U-shaped tube 14 is provided a small knob 22 upon which drops of liquid are formed by condensation and which houses a thermocouple 23 for obtaining the drop temperature. Below the knob 22, at a distance not exceeding one drop diameter, is a heated filament 25 of high resistance and high temperature coefficient of resistivity, such as nichrome wire of 0.005 inch diameter, supported between two insulated electrodes 26 and 27 which supply a current flow to maintain the filament 25 normally at an elevated temperature. The electrodes 26 and 27 pass through the insulated mountings 28 and 29 threaded in the wall of chamber 12 and are connected by leads 24 and 24a to the control circuit 43.

The lower end of the chamber 12 is provided with a removable catch-pot 36 supported by ring 42 and having a thermowell 37 for thermocouple 38. The emf from the thermocouple 38 actuates temperature controller 39 for controlling the heat input by heater 40 to vaporizer coil 10 and hence the temperature at the down-turned outlet 11a of the conduit 11 from the coil 10.

In operation, the collector 13 is first heated to a temperature above the dew point temperature of the sample by applying electrical current by leads 17 and 17a. Cold oil is passed through the tube 14 from the reservoir 21 by means of pump 18, and the temperature of the collector decreases until a drop of liquid, condensed from the surrounding vapors, accumulates on the knob 22 on the base of the U-tube 14 and falls therefrom onto the hot filament 25 below. The temperature of this falling drop is the dew point temperature of the vapor under test and the thermocouple 23 generates a corresponding emf which is transmitted by leads 30 and 31 to the temperature recorder-controller 32. The temperature recorder-controller 32 can be connected by 46 to the controlled element whether it be a pump, a valve, or the like, so as to utilize the responses to the changes in, or the empirical readings of, the dew point of a flowing stream of vapor.

The uncondensed vapors passing over the detector 13 flow from the test chamber 12 via outlet 33 into a condenser 34 which may be of the conventional liquid coolant type wherein a cooling liquid is circulated about a condenser tube 35 and the condensate accumulated as desired.

The change in resistance of the filament 25 produced by the falling drop from knob 22 triggers the electronic controller 43 which in turn closes the relay 44 connecting the thermocouple leads 30 and 31 to the recorder-controller 32 and applies power to the detector 13 through heating leads 17 and 17a thereby again raising the temperature of the detector 13 to above the dew point of the test vapor. The relay 44 reopens when sufficient heat has been supplied to the filament 25 to vaporize the drop and restore the filament 25 to its normal high temperature resistance.

The electronic controller 43 may be of any desired type and may, for example, comprise a D. C. power supply feeding a Thyratron tube in which the control relay 44 is connected to the plate circuit and the filament 25 is a portion of the resistance of the grid bias.

The collector 13 has been illustrated in the drawing as comprising a U-tube 14 having the bottom projection 22 accommodating the thermocouple 23. It is also contemplated that the collector 13 may comprise a finger tube consisting of an inner delivery duct open at its lower end and terminating near the closed end of an outer return tube or sheath. On the bottom of the finger tube may be provided a projection for discharging the condensate drop onto the filament 25. The entire detector assembly may be supported within the chamber 12 by means of the plug 16. A cooling fluid may be circulated through the finger tube by means of the inlet duct and the return sheath, and leads 17 and 17a may be applied at spaced points to the outer return tube to add heat to the detector as described in connection with the U-tube assembly. Likewise the thermocouple 23 can be embedded in the projection of the finger tube.

Although my invention has been described in considerable detail in terms of a specific apparatus, it should be understood that this is by way of illustration only and that the invention is not limited thereto, since alternative embodiments and operating techniques will become apparent to those skilled in the art in view of my disclosure. Accordingly, modifications in the method and apparatus of my invention are contemplated without departing therefrom.

What I claim is:

1. An apparatus for measuring and indicating the dew point of a hydrocarbon vapor which includes a condensation-sensitive detector, said detector including a condensation collector, means for controlling the temperature of said collector, means for measuring the temperature at the point of condensation on said collector, a heated filament in a control circuit disposed below said collector and responsive to condensate discharged from said collector, and relay means actuated by said circuit for controlling the heat input to said collector.

2. An apparatus for determining the dew point of a hydrocarbon vapor including a condensation-sensitive heated filament, a cyclically heated condensation collector means disposed next above said heated filament a distance greater than can be bridged by a drop of condensate, means for applying electrical heating current to said collector means, means for circulating collector fluid through said cooling means, a control circuit including said heated filament, a relay actuated by said control circuit, and a temperature recorder actuated by said relay.

3. Apparatus for determining the dew point of a hydrocarbon vapor comprising a tubular chamber through which the vapor may be conducted, a heat-conductive condensation collector element disposed within said chamber, means for cooling said heat-conductive element providing a temperature gradient in said chamber, means for collecting condensate on said element, and means for determining the temperature at the point on said heat-conductive condensation collector element where liquid condensate accumulates, said element including a hot wire filament disposed below said point of condensate accumulation to receive condensate therefrom by gravity.

4. A dew point detector apparatus comprising a generally cylindrical housing, a hollow condenser tube extending within said housing, electrical conductor means connected to said tube exterior of said housing, conduit means communicating with the said tube and adapted to flow cooling fluid therethrough, a heat-conductive projection on said tube, a thermocouple means embedded within said projection, an electrical control circuit, and a hot-wire filament in said circuit and disposed below said projection transversely of said housing whereby condensate dropping from said projection impinges on said filament.

5. Apparatus for determining the dew point of a hydrocarbon vapor comprising an elongated chamber through which gas may be conducted, a U-shaped heat-conductive tube disposed in said chamber near the upper end thereof, a means for flowing a cooling fluid through said U-shaped tube, electrical means for resistance heating of said tube, means on the lower end of said U-shaped tube for accumulating condensate, a hot-wire filament disposed below said U-shaped tube and connecting in a control circuit, thermocouple means in the lower part of said U-shaped tube adapted to measure the temperature of the condensate thereon, and relay means actuated by said control circuit for actuating switch means in the said heating circuit.

6. A dew point detector apparatus comprising a generally cylindrical housing having a closed end and an open end, a threaded plug for said open end, a U-shaped tube having its upturned legs passing through said threaded plug, electrical conductor means connected to the legs of said U-shaped tube exterior of said plug, conduit means communicating with the said U-shaped tube and adapted to flow cooling fluid therethrough, a heat-conductive knob on the base of said U-tube, a thermocouple means embedded within said knob and passing through said threaded plug, and a hot-wire filament disposed below said knob and connected in an electrical control circuit, said filament being mounted transversely of said housing whereby condensate from said U-tube is transferred by gravity to said filament.

7. Apparatus for determining the dew point of a hydrocarbon vapor comprising an elongated chamber through which gas may be conducted, a heat-conductive condenser tube extending within said chamber, means for flowing a cooling fluid through said tube, electrical means for resistance-heating of said tube, projection means on the lower end of said tube for collecting condensate, a hot-wire filament disposed below said projection and connected in a control circuit, thermocouple means embedded in said projection and adapted to measure the temperature of the condensate thereon, and relay means actuated by said control circuit for actuating a switch means in said tube heating circuit.

8. An apparatus for determining and recording the dew point of a hydrocarbon vapor comprising a vaporizing coil, a dew point measuring chamber, a condensation detector means within said chamber, an inlet to said chamber from said vaporizing coil, a vapor outlet from said chamber at a point remote from said inlet, said detector means including a condensing surface in the form of a hollow U-tube, a thermocouple means embedded in the base of said U-tube, electrical heating means for said U-tube, means exterior of said chamber for circulating cooling fluid through said U-tube, a hot-wire filament extending across said chamber below the base of said U-tube, a control circuit including said filament, a relay actuated by said control circuit, a switch means controlling said electrical heating means, said relay actuating said switch means, a temperature recorder, conductors between said recorder and said thermocouple, means including a second switch means also actuated by said relay, a second thermocouple in the base of said dew point measuring chamber, an electrical heater for said vaporizing coil, and control means actuated by said second thermocouple for maintaining the desired temperature in said vaporizing coil.

9. In an apparatus for determining the dew point of a hydrocarbon vapor stream, the improvement which comprises a vertically arranged cylindrical chamber, an inlet to said chamber near the bottom thereof, an outlet from said chamber near the top thereof, a temperature-controlled dew point detector interposed said inlet and said outlet, said detector including a hot-wire filament and a hollow U-tube mounted in the path of flow through said chamber, means for circulating a cooling fluid through said U-tube, electrical means for heating said U-tube, a control circuit means including said hot-wire filament, said circuit being unbalanced by the impingement of a condensate droplet from said U-tube onto said filament, a relay means, said relay being controlled by said control circuit, a switch means for controlling said heating of said U-tube and actuated by said relay, a second switch means in circuit with a temperature recorder, a thermocouple adjacent said U-tube, and switch means between said thermocouple and said recorder, said switch means being actuated by said relay.

10. An apparatus for measuring and indicating the dew point of a hydrocarbon liquid which includes in combination a measuring chamber, means exterior of said chamber for vaporizing the liquid, means for flowing the hot vapor upwardly through said measuring chamber, means for alternately cooling and heating a means depending within said measuring chamber in a localized upper portion of said measuring chamber, said means for cooling and heating being adapted to attain temperatures above and below the dew point of said liquid whereby the flowing vapor is cooled below its dew point to produce condensate in an upper portion of said chamber, means for collecting condensate in said upper portion, filament means disposed below and spaced from said collecting means for electrically detecting the presence of such condensate, means for indicating the temperature on said condensate collecting means at the time of condensation as a measure of the dew point of the liquid, and means for increasing the temperature of the said localized portion of the upper part of said chamber in response to the presence and detection of such collected condensate, said increased temperature being high enough to vaporize the collected condensate.

References Cited in the file of this patent

UNITED STATES PATENTS

| Number | Name | Date |
|---|---|---|
| 2,268,785 | Thornthwaite | Jan. 6, 1942 |
| 2,435,895 | McIlvaine | Feb. 10, 1948 |

FOREIGN PATENTS

| Number | Country | Date |
|---|---|---|
| 317,306 | Great Britain | Aug. 12, 1929 |